United States Patent
Helman

(10) Patent No.: US 10,387,163 B2
(45) Date of Patent: Aug. 20, 2019

(54) OPERATING ON DATA STREAMS USING CHAINED HARDWARE INSTRUCTIONS

(71) Applicant: Oracle International Corporation, Redwood City, CA (US)

(72) Inventor: Jonathan Helman, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 50 days.

(21) Appl. No.: 15/841,375

(22) Filed: Dec. 14, 2017

(65) Prior Publication Data
US 2019/0187996 A1    Jun. 20, 2019

(51) Int. Cl.
*G06F 9/30* (2018.01)
*G06F 9/38* (2018.01)
*G06F 9/54* (2006.01)

(52) U.S. Cl.
CPC .......... *G06F 9/3867* (2013.01); *G06F 9/3851* (2013.01); *G06F 9/544* (2013.01)

(58) Field of Classification Search
None
See application file for complete search history.

(56) References Cited

U.S. PATENT DOCUMENTS

| | | | |
|---|---|---|---|
| 5,675,773 A | 10/1997 | Devic | |
| 6,330,659 B1 | 12/2001 | Poff | |
| 6,559,780 B2 | 5/2003 | Huang | |
| 7,581,088 B1 | 8/2009 | Metzgen | |
| 8,910,176 B2 * | 12/2014 | Lindsay | G06F 9/5061 718/105 |
| 2009/0077011 A1 * | 3/2009 | Natarajan | G06F 16/24532 |
| 2017/0235752 A1 | 8/2017 | Shih | |
| 2017/0277562 A1 * | 9/2017 | Christian | G06F 9/4881 |

* cited by examiner

*Primary Examiner* — Corey S Faherty
(74) *Attorney, Agent, or Firm* — Meyertons, Hood, Kivlin, Kowert & Goetzel, P.C.

(57) ABSTRACT

A method for accessing and using a hardware acceleration circuit in a computer system is disclosed. The computer system may receive a single call to a particular library function that is implemented by a hardware acceleration circuit included in the computer system. A plurality of chained hardware instructions is generated in response to the single call, wherein the plurality of chained hardware instructions is based on different ones of a plurality of flags and a plurality of data streams specified by the single call. The computer system may send the plurality of chained hardware instructions to the hardware acceleration circuit for execution.

20 Claims, 5 Drawing Sheets

OPERATING ON DATA STREAMS USING CHAINED HARDWARE INSTRUCTIONS

BACKGROUND

Technical Field

This disclosure relates to specialized data processing using hardware acceleration circuits and more particularly to chaining hardware instructions on the acceleration circuits.

Description of the Related Art

Modern computer systems may include multiple processors or processor cores configured to execute software programs or applications. The programs and applications may allow the processors or processor cores to perform a variety of tasks. For example, when executing a database management software program, the computer system may access data stored on a storage device, perform operations on the accessed data, and store the modified data on the storage device.

To improve performance, some computer systems, may include specialized processing circuits (commonly referred to as "hardware acceleration circuit") designed to implement particular functions. To implement such functions with a general-purpose processor may involve the execution of multiple program instructions. A hardware acceleration circuit may be able to accomplish such a function with the execution of fewer program instructions.

Software programs and applications may be written in a high-level programming language, such as, e.g., Java™, C, C++, and the like. In some cases, a high-level programming language may include references to a library, which includes functions specific to a hardware acceleration circuit. Such libraries may be included as part of an operating system used by the computer system.

SUMMARY OF THE EMBODIMENTS

Various embodiments of a method for using a hardware acceleration circuit are disclosed. Broadly speaking, a computer system may receive a single call to a particular library function that is implemented by a hardware acceleration circuit included in the computer system. The single call to the particular library function specifies a plurality of flags and specifies operations on a plurality of data streams. The computer system may generate a plurality of chained hardware instructions, in response to the single call. The plurality of chained hardware instructions may be based on different ones of the plurality of flags, and that operate on different ones of the plurality of data streams. The computer system may send the plurality of chained hardware instructions to the hardware acceleration circuit for execution to implement the particular library function.

In another embodiment, the hardware acceleration circuit may perform a first operation on a first data stream of the plurality of data streams to generate intermediate data, in response to executing a first hardware instruction of the plurality of chained hardware instructions.

In a non-limited embodiment, the hardware acceleration circuit may perform a second operation on a second data stream to generate and store second intermediate data, in response to executing a second hardware instruction of the plurality of chained hardware instructions. The hardware acceleration circuit may perform a third operation using the first and second intermediate data, in response to executing a third hardware instruction of the plurality of chained hardware instructions.

Figure 1:
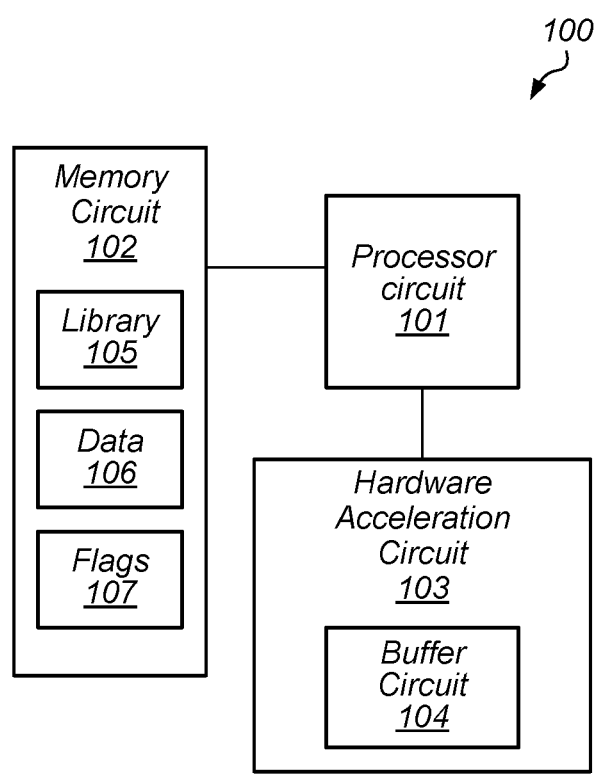
FIG. 1 is a block diagram of an embodiment of a computer system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph (f) interpretation for that unit/circuit/component. More generally, the recitation of any element is expressly intended not to invoke 35 U.S.C. § 112, paragraph (f) interpretation for that element unless the language "means for" or "step for" is specifically recited.

DETAILED DESCRIPTION OF EMBODIMENTS

In some computer systems, specialized hardware may be employed to accelerate certain operations, such as, database operations, for example. Such specialized hardware may include one or more circuits configured to perform one or more logic or other operations. To make use of such specialized hardware, an operating system library may be provided with the computer system that provides functions to access the specialized hardware.

In some cases, the operating system library provides a low-level interface to the specialized hardware, resulting in multiple calls to the operating system library to accomplish some operations. Using multiple calls increases the complexity of application software, and results in additional power consumption and reduced performance of the computer system. The embodiments illustrated in the drawing and described below may provide techniques for utilizing specialized hardware, while reducing software complexity, reducing power consumption, and improving system performance.

An embodiment of a computer system that includes a hardware acceleration circuit is illustrated in FIG. 1. In the illustrated embodiment, computer system 100 includes processor circuit 101, memory circuit 102, and hardware acceleration circuit 103. In various embodiments, processor circuit 101, memory circuit 102, and hardware acceleration circuit 103 may be fabricated on a single silicon substrate using a semiconductor manufacturing process, or may be fabricated separately and coupled together on a common circuit board, substrate, or by any other suitable means.

During operation, processor circuit 101 may execute numerous software or application programs. As part of database operation or other data processing operations, the software or application programs may include instructions to operate on single data streams or to pre-process multiple data streams and combine them into a single resultant data stream. Such data streams may be stored in regions of memory circuit 102, such as, e.g., data 106, or any other suitable storage locations.

In order to improve performance, such data stream operations may be performed using hardware acceleration circuit 103. In order to access the capabilities, special library functions included in a software library, such as, e.g., library 105, may be used. Such library functions may include functions for gathering, indexing, filtering, or any other suitable operations that may be performed on the input data streams.

Prior to calling a library function that uses hardware acceleration circuit 103, processor circuit 101 may set one or more first flags for a first data stream. As described below in more detail, the library function may operate on multiple data streams. In those cases, one or more second flags may be set for the second data stream. As used and described herein, a flag refers to an indicator that an operation is to be performed on a data stream.

An example of setting such flags is illustrated in Code Example 1. In Code Example 1, the flags are set to the GATHERED value, which specifies how data is to be handled. For example, in response to the GATHERED value of the flag, the data may be processed according to one or more offsets and lengths, where the offsets are used to identify various starting points in a data stream, and lengths identify a number of data units to retrieve from the data stream beginning at the various starting points. For example, an offset of 2 and a length of 3 would select data bits bbb from a data stream including aabbbccc. The values for the offsets and lengths may be included in the metadata included in the src.gather substructure. It is noted that the flags and metadata are included in a src data structure. In various embodiments, the src data structure may include a pointer to the data stream, along with the flags, associated metadata, and any other suitable information related to the data stream.

Code Example 1 src.flags=GATHERED
    src.gather={<metadata of gather>}

It is noted that the pseudo-code depicted in Code Example 1 depicts a particular one of various flag values. In other embodiments, any suitable flag value may be employed. For example, in some embodiments, values of FILTERED or INDEXED may also be employed.

Once the flags have been set, processor circuit 101 may execute an instruction that calls a library function using either the first data, or the first and second data in the case of a multiple data stream operation. The library function may be included in library 105, which may be included as part of an operating system associated with computer system 100. An example of such a library function call is illustrated in Code Example 2, which depicts a single data stream operation library function call. In Code Example 2, which may, in various embodiments, be invoked after Code Example 1, the src data structure, which includes the flags and any associated metadata, is passed to the library function, along with dst a desired destination for the result of the operation.

Code Example 2 accelerator_op_<operation>(src, dst)

Once the library function has been called, processor circuit 101 may generate multiple chained hardware instructions, which are sent to hardware acceleration circuit 103 for execution in order to implement the library function. As used and defined herein, chained hardware instructions are hardware instructions where an output of a particular hardware instruction is used as an input to another hardware instruction. An operating system, or other software layer, executing on processor circuit 101, may generate the hardware instructions using the library function. In executing the chained hardware instructions, hardware acceleration circuit 103 may execute a first hardware instruction that performs a first operation on the first data to generate a result. The result of the first hardware instruction is referred to herein as "intermediate data." The first operation may be selected based on a value of at least one of the one or more first flags. Hardware acceleration circuit 103 may then store the intermediate data in buffer circuit 104 for use in another hardware instruction chained to the first hardware instruction.

In cases where the called library function operates on multiple data streams, the hardware acceleration circuit may execute a second hardware instruction of the chained hardware instructions to perform a second operation using the second data and stored intermediate data resulting from executing a first hardware instruction. It is noted that in some embodiments, the second hardware instruction may commence after a portion of the first hardware instruction has completed.

In other cases where the called library functions operate on multiple data streams, the hardware acceleration circuit may execute a second hardware instruction of the chained hardware instructions to perform a second operation to generate and store second intermediate data using the second data stream. The hardware acceleration circuit may then execute a third hardware instruction of the chained hardware instructions to perform a third operation using the first and second intermediate data.

Since the first intermediate data and, in some cases, second intermediate data, are stored in buffer circuit 104, there is no need for a memory access operation to retrieve a result from the first operation. By eliminating such memory accesses, the time required to execute the library function may be reduced. Moreover, the power consumed by the computer system during execution of the library function may also be reduced, as well as increasing the performance of the computer system by performing some operations in parallel.

Processor circuit 101 may, in various embodiments, be representative of a general-purpose processor that performs computational operations. For example, processor circuit 101 may be a central processing unit (CPU) such as a microprocessor, a microcontroller, an application-specific integrated circuit (ASIC), or a field-programmable gate array (FPGA).

Memory circuit 102 may include any suitable type of memory such as a Dynamic Random-Access Memory (DRAM), a Static Random-Access Memory (SRAM), a Read-only Memory (ROM), Electrically Erasable Programmable Read-only Memory (EEPROM), or a non-volatile memory, for example. It is noted that in the embodiment of a computer system illustrated in FIG. 1, a single memory circuit is depicted. In other embodiments, any suitable number of memory circuits may be employed.

Hardware acceleration circuit 103 may be designed according to one of various design styles, and may include multiple logic circuits configured to perform specific functions associated with the functions included in library 105. In some cases, the logic circuits may be arranged in a pipelined fashion, or may include multiple data paths that may be operated in parallel. In some embodiments, hardware acceleration circuit 103 may include adder circuits, multiplier circuits, comparator circuits, and any other circuit suitable for processing data.

In the embodiment of FIG. 1, buffer circuit 104 may be a particular embodiment of a storage circuit configured to store data. Buffer circuit 104 may, in various embodiments, include multiple data storage circuits, such as, e.g., a SRAM memory cell, in which each data storage circuit may be configured to store a data bit. Although hardware acceleration circuit 103 is depicted as including a single buffer, in other embodiments, any suitable number of buffers may be employed. It is noted that buffer circuit 104 may be located in different parts of computer system 100, and that including buffer circuit 104 in hardware acceleration circuit 103 is an example of one particular location.

Figure 2:
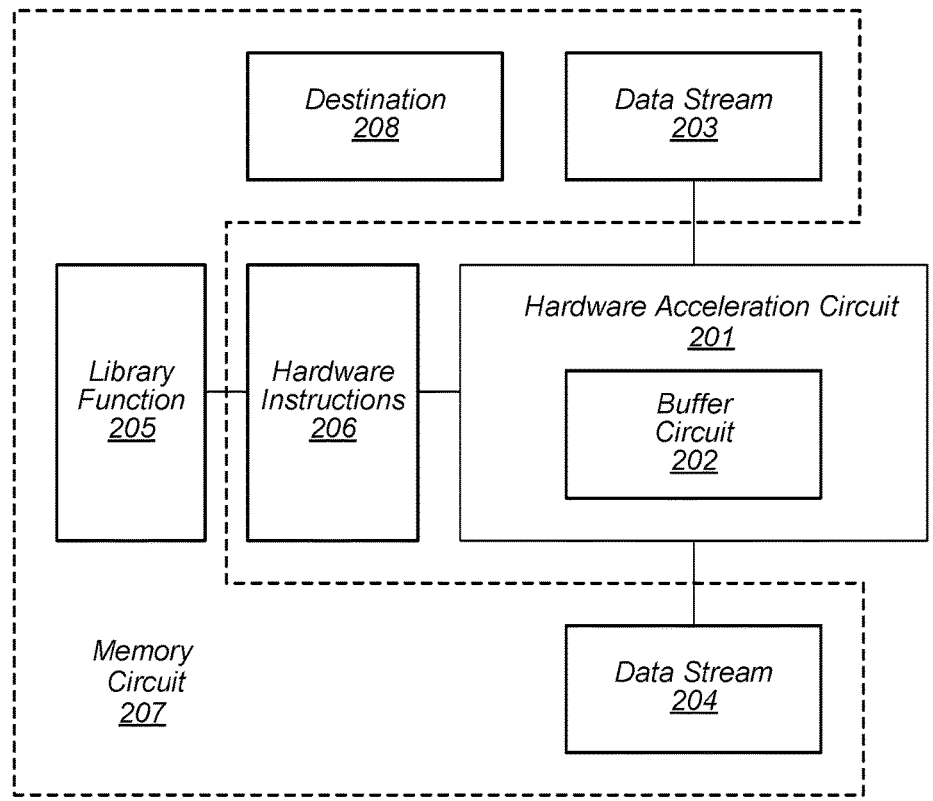
FIG. 2 illustrates a block diagram of a data stream being processed using a hardware acceleration circuit.

As mentioned above, some of the library functions available to users for inclusion in software programs or applications may operate on multiple data streams. A block diagram depicting an operation performed on two data streams is illustrated in FIG. 2.

In the illustrated embodiment, hardware acceleration circuit 201 may be configured to receive data streams 203 and 204. The two data streams, along with library function 205 may be located in memory circuit 207, which may, in some embodiments, correspond to memory circuit 102 as illustrated in FIG. 1. In various embodiments, hardware acceleration circuit 201 may correspond to hardware acceleration circuit 103 as depicted in the embodiment of FIG. 1. Hardware acceleration circuit 201 includes buffer circuit 202, which may be configured to store intermediate data resulting from a library function. It is noted that although only a single buffer circuit is depicted, in other embodiments, hardware acceleration circuit 201 may include any suitable number of buffer circuits, each of which may be located in different regions of a computer system.

Library function 205 is a function that employs the computing resources of hardware acceleration circuit 201. In various embodiments, library function 205 may be included as part of larger library, such as, e.g., library 105, as illustrated in FIG. 1. Library function 205 may be called by a software program or application to use the computing resources of hardware acceleration circuit 201 to improve performance of database processing functions, or other suitable processing functions. As described above, prior to calling library function 205, multiple flags may be set. An example for setting multiple flags is shown in Code Example 3. In Code Example 3, the first data stream flag is set to GATHERED, while the second data stream flag is set to INDEXED Since the flag for the second data stream is set to INDEXED, metadata associated with the index operation is also set for second data stream, and since the flag for the first data stream is set to GATHERED, metadata associated with offsets and lengths for the first data stream are also set for the first data stream.

Code Example 3

```
src1.flags=GATHERED
src1.gather={<metadata of gather>}
src2.flags=INDEXED
src2.indices={<metadata of index operation>}
```

Once the flags and metadata have been set, library function 205 may be called. An example of calling a library function to operate on two data streams is depicted in Code Example 4, wherein src1 is a data structure that includes a pointer to the first data stream as well as associated flags and metadata, src2 is a data structure that includes a pointer to the second data stream as well as associated flags and metadata, and dst is a data structure that includes at least a pointer to a destination in which the result of the operation will be stored. In various embodiments, Code Example 4 would follow code, such as depicted in Code Example 3, to setup flags and metadata. It is noted that the dst data structure may be included in destination 208, located in memory circuit 207.

Code Example 4

```
accelerator_op_<operation>(src1, src2, dst)
```

Once library function 205 has been called, along with any flags, metadata, or other suitable information, library function 205 may be used to generate hardware instructions. In various embodiments, hardware instructions 206 may include multiple chained instructions, which are executed by hardware acceleration circuit 201, such that an output, i.e., intermediate data, of one hardware instruction is used as an input to another hardware instruction. The output of the one hardware instruction may be stored in buffer circuit 202 for use by the other hardware instruction. A final result of the other hardware instruction may be stored in a memory storage location, such as, memory 102 as depicted in FIG. 1, for example.

In various embodiments, an operating system, or other software layer, executing on a processor, may generate hardware instructions 206 using library function 205. By providing architectural changes in a computer system to allow for chained hardware instructions, the computer system may, in some embodiments, perform some data processing tasks more quickly and with less power consumption.

It is noted that the embodiment depicted in FIG. 2 is merely an example. In other embodiments, hardware acceleration circuit 201 may be configured to allow the execution of library functions that operate on more than two data streams.

Figure 3:
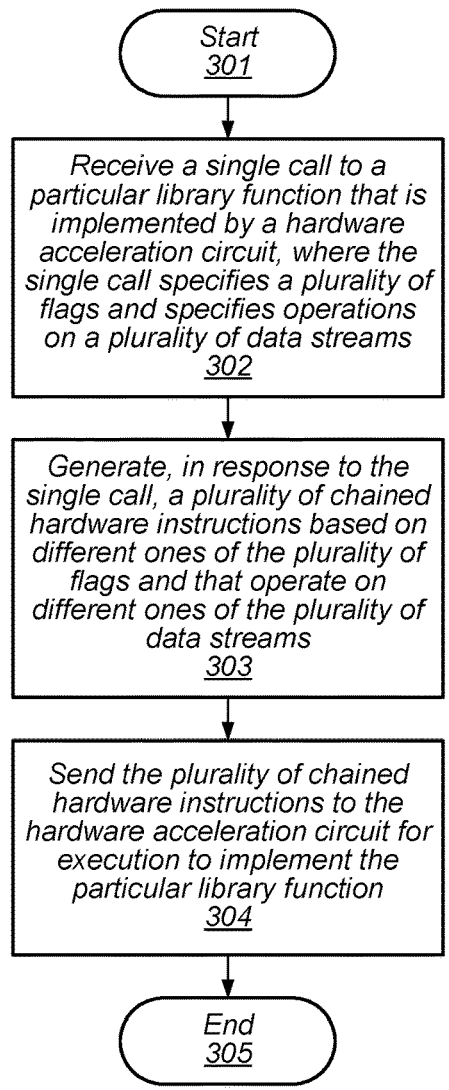
FIG. 3 illustrates a flow diagram depicting an embodiment of a method for processing data using a hardware acceleration circuit.

Turning to FIG. 3, a flow diagram depicting an embodiment of a method for using a hardware acceleration circuit in a computer system is depicted. The method begins in block 301.

The computer system may then receive a single call to a particular library function that is implemented by a hardware acceleration circuit, where the single call specifies a plurality of flags and specifies operations on a plurality of data streams (block 302). In various embodiments, the particular library function may be included in a software library.

It is noted that the software library may include multiple functions, each of which allow activation or use of different circuits included within the hardware acceleration circuit, or cause the hardware acceleration circuit to perform different operations. It is further noted that library functions included in the software library may allow for the generation of chained hardware instructions that allow for pipelined operations to be performed on one or multiple data streams. For example, an operation may be performed on a first data stream, and then another operation may be performed using a result of the first operation and a second data stream.

In various embodiments, data for the plurality of flags specified in the single call may be stored in a register or other suitable storage circuit included in a memory circuit of a computer system, such as the embodiment of a computer system depicted in FIG. 1. In some cases, the flags may be set in response to the execution of one or more software or program instructions.

The plurality of data streams specified, as part of the single call, may be stored in a memory, such as, e.g., memory circuit 102, or other suitable storage device. In some embodiments, the data streams may correspond to portions of a database.

The computer system may then generate, in response to the single call, a plurality of chained hardware instructions based on different ones of the plurality of flags and that operate on different ones of the plurality of data streams (block 303). As described above, hardware instructions may be chained together to reduce memory access overhead and improve performance of the computer system. The types of instructions included in the chained hardware instructions may be based on one or more of the plurality of flags. For example, a particular flag and associated metadata may be set to indicate a filter operation. In other cases, the particular flag and associated metadata may be set to indicate a gather operation.

The computer system may then send the chained hardware instructions to the hardware acceleration circuit for execution to implement the particular library function (block 304).

When executing the chained hardware instructions to implement the particular library function, the hardware acceleration circuit may save intermediate results in a buffer. For example, the hardware acceleration circuit may execute a first hardware instruction of the plurality of chained hardware instructions to perform a first operation on a first data stream of the plurality of data streams, and save intermediate data of the first operation in the buffer. As described above, the first operation may include filtering the first data, gathering the first data based upon a list of offsets and lengths, retrieving the first data using a vector of indices to access an array containing the first data, or any other suitable operation.

As described above in regard to FIG. 1, a hardware acceleration circuit may include a buffer or other suitable storage circuit that allows for the storage of the intermediate data. By including localized storage in the hardware acceleration circuit, the architecture of the computer system is improved to allow for subsequent operations to be performed by the hardware acceleration circuit using the intermediate data without accesses to main memory, which can result in additional delay and power consumption.

In addition to executing the first instruction of the plurality of chained hardware instructions, the hardware acceleration circuit may then execute a second hardware instruction, which is chained to the first hardware instruction, to perform a second operation using the intermediate data, and possibly a second data stream of the plurality of data streams. Since the result of the first operation, i.e., the intermediate data, is locally available within the hardware acceleration circuit, if the second operation consumes only results of the first operation, the second operation can be performed without accesses to main memory. By eliminating such accesses to main memory, the computer system can perform the first and second operations with improved throughput. The method may then conclude in block 305.

It is noted that the embodiment of the method depicted in FIG. 3 is merely an example. In other embodiments, different operations and different orders of operations may be employed.

Figure 4:
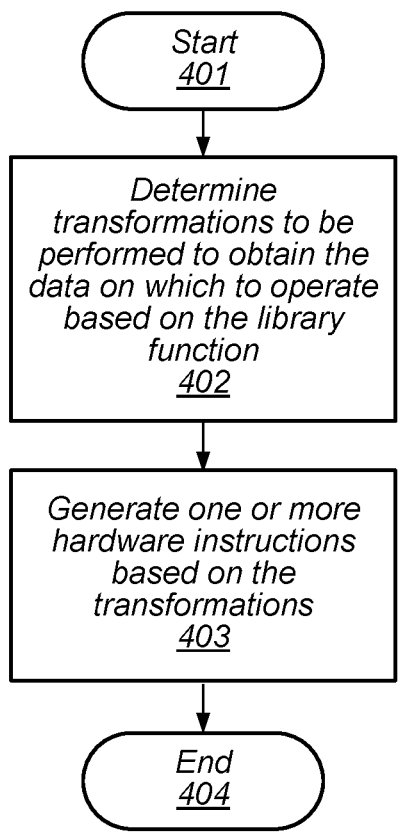
FIG. 4 illustrates a flow diagram depicting an embodiment of a method for translating a library function.

Turning to FIG. 4, a flow diagram depicting an embodiment of a method for translating a library function is illustrated. In various embodiments, the embodiment of the method depicted in the flow diagram of FIG. 4 may be included as part of the operations included in block 303 of the flow diagram of FIG. 3. The method begins in block 401.

The transformations that are to be performed to obtain the data on which to operate based on the library function may then be determined (block 402). As mentioned above, the data to be processed may be stored in different formats, and as such, may need to be transformed before being used in subsequent operations. For example, such transformations may include filtering the data, gathering the data based upon a list of offsets and lengths, retrieving the data using a vector of indices to access an array containing the data, or any other suitable operation. In various embodiments, the flags described in regard to FIG. 3 may be used to indicate a transformation to be performed.

One or more hardware instructions may then be generated based on the transformation (block 403). As described above, the operating system or other software layer may generate one or more hardware instructions to be passed to the hardware acceleration circuit in order to accomplish the desired library function. Each of the hardware instructions, when executed by the hardware acceleration circuit, may cause the hardware acceleration circuit to perform a series of specific tasks, with the end result being the completion of the desired library function.

For example, in the case of Code Examples 3 and 4, three hardware instructions may be generated, as shown in Table 1. As depicted in Table 1, the first two hardware instructions are related to retrieving the desired data streams on which to operate. It is noted that the specific hardware instructions are based upon the flags previously set for the two data streams, in this case, GATHERED and INDEXED The output of the first two hardware instructions is piped to the input of the third operation, therefore, chaining the operations together, so they are executed in response to a single call to a library function. It is noted that although only three hardware instructions are depicted in Table 1, in other embodiments, any suitable number of hardware instructions may be generated based on a number of data streams being operated upon, values for the flags for the data streams, and the like.

In various embodiments, the first two operations may generate respective intermediate data, which may be stored in respective buffer circuits, such as, e.g., buffer circuit 202, upon completion of relevant portions of the first two operations. The third operation may then access the intermediate data to perform the third operation.

In some embodiments, the hardware acceleration circuit may perform both of the first two hardware instructions in parallel. In embodiments where the first two operations are chained to a third operation, upon completion of relevant portions of the first two hardware instructions, the hardware acceleration circuit may perform the third hardware operation.

TABLE 1

Generated Hardware Instructions

| | |
|---|---|
| 1 | gather stream 1 |
| 2 | index stream 2 |
| 3 | perform operation on the two streams |

Once the hardware instructions have been generated, the method may conclude in block 404. It is noted that the embodiment of the method illustrated in the flow diagram of FIG. 4 is merely an example. In other embodiments, different operations and different orders of operations are possible and contemplated.

Figure 5:
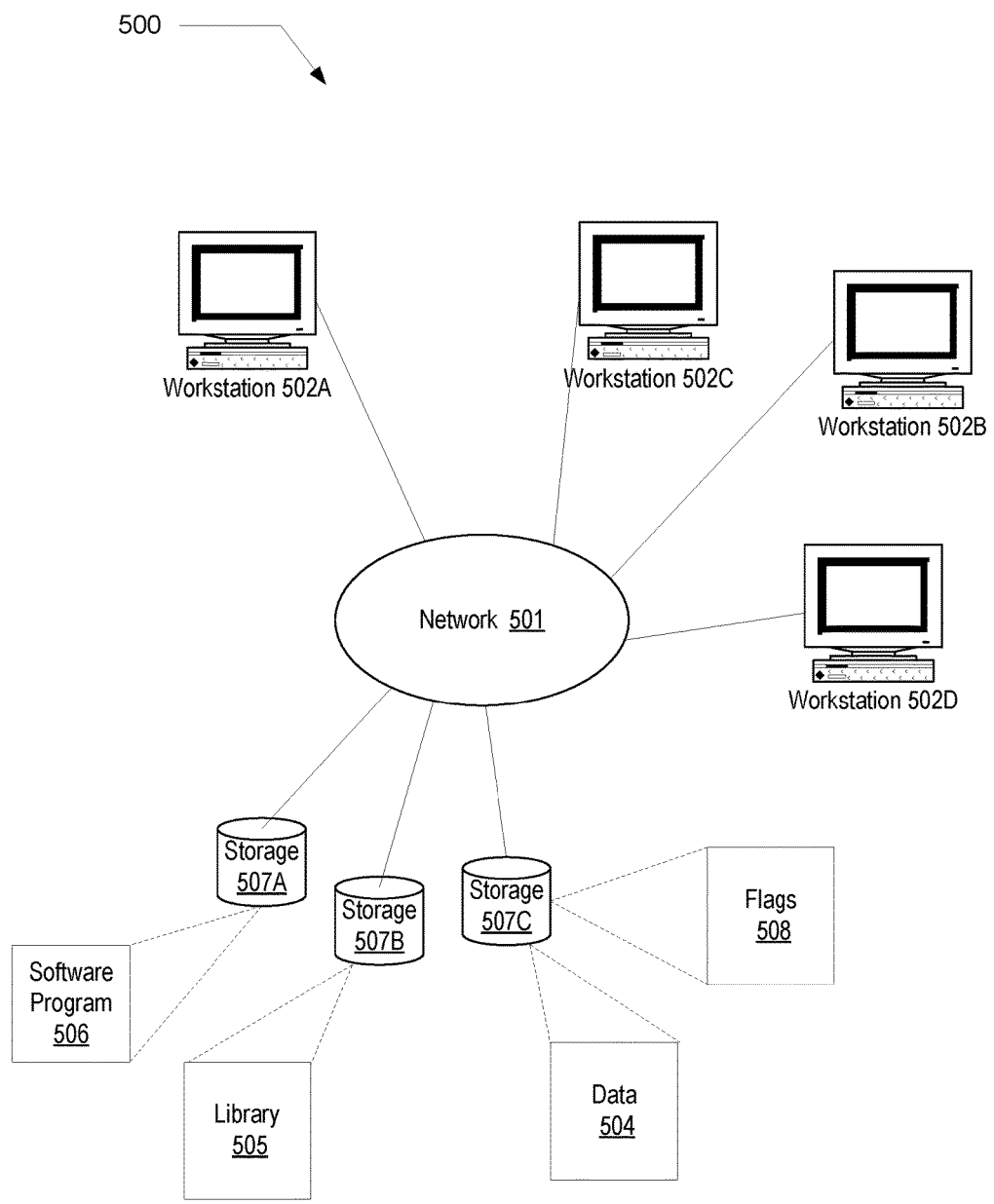
FIG. 5 is a block diagram of one embodiment of a computer system that includes a hardware acceleration circuit.

Turning to FIG. 5, a block diagram of one embodiment of a computer system is illustrated. The computer system 500 includes a plurality of workstations designated 502A through 502D. The workstations are coupled together through a network 501 and to a plurality of storage devices designated 507A through 507C. In one embodiment, each of workstations 502A-502D may be representative of any standalone computing platform that may include, for example, one or more processors, hardware acceleration circuits, local system memory including any type of random access memory (RAM) device, monitor, input output (I/O) means such as a network connection, mouse, keyboard, and the like (many of which are not shown for simplicity).

In one embodiment, storage devices 507A-507C may be representative of any type of mass storage device such as hard disk systems, optical media drives, tape drives, RAM disk storage, and the like. As such, program instructions for different applications may be stored within any of storage devices 507A-507C and loaded into the local system memory of any of the workstations during execution. As an example, as shown in FIG. 5, software program 506 is shown stored within storage device 507A, and library 505 is stored within storage device 507B. Further, data 504 and flags 508 are stored within storage device 507C.

In one embodiment, data functions, included in library 505, may be used by a hardware acceleration circuit on a given one of workstations 502A-D. As described above, software program 506 may include one or more calls to functions included in library 505. Such function calls may be part of an operation to process data 504. Prior to operating on data 504, software instructions may be executed to store data 504 and flags 508 in system memory included in one of workstations 502A-D. As part of making the function calls, software program 506 may set values for flags 508, which may be sent along with data 504 to a hardware acceleration circuit included in one of workstations 502A-D.

It is noted that the embodiment of a computer system depicted in FIG. 5 is merely an example. In other embodiments, different numbers of workstations, and different numbers of storage devices, along with different arrangements of workstations and storage devices may be employed.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
receiving, by a computer system, a single call to a particular library function that is implemented by a hardware acceleration circuit included in the computer system, wherein the single call specifies a plurality of flags and specifies operations on a plurality of data streams;
generating, by the computer system, a plurality of chained hardware instructions in response to the single call, wherein the plurality of chained hardware instructions is based on different ones of the plurality of flags and that operate on different ones of the plurality of data streams; and
sending, by the computer system, the plurality of chained hardware instructions to the hardware acceleration circuit for execution to implement the particular library function.

2. The method of claim 1, further comprising, performing, by the hardware acceleration circuit, a first operation on a first data stream of the plurality of data streams to generate and store first intermediate data, in response to executing a first hardware instruction of the plurality of chained hardware instructions.

3. The method of claim 2, further comprising:
performing, by the hardware acceleration circuit, a second operation on a second data stream of the plurality of data streams to generate and store second intermediate data, in response to executing a second hardware instruction of the plurality of chained hardware instructions; and
performing, by the hardware acceleration circuit, a third operation using the first intermediate data and the second intermediate data, in response to executing a third hardware instruction of the plurality of chained hardware instructions.

4. The method of claim 2, further comprising, performing, by the hardware acceleration circuit, a second operation using a second data stream of the plurality of data streams and the first intermediate data, in response to executing a second hardware instruction of the plurality of chained hardware instructions.

5. The method of claim 2, wherein performing the first operation includes filtering the first data stream based on metadata associated with the plurality of flags, wherein the metadata includes filter data.

6. The method of claim 2, wherein performing the first operation includes gathering the first data stream based on metadata associated with the plurality of flags, wherein the metadata includes a list of offsets and lengths.

7. A non-transitory computer-accessible storage medium having program instructions stored therein that, in response to execution by a computer system, causes the computer system to perform operations including:
receiving, by the computer system, a single call to a particular library function that is implemented by a hardware acceleration circuit included in the computer system, wherein the single call specifies a plurality of flags and specifies a plurality of data streams;
generating, by the computer system, a plurality of chained hardware instructions in response to the single call, wherein the plurality of chained hardware instructions is based on different ones of the plurality of flags and that operate on different ones of the plurality of data streams; and
sending, by the computer system, the plurality of chained hardware instructions to the hardware acceleration circuit for execution to implement the particular library function.

8. The non-transitory computer-accessible storage medium of claim 7, wherein the plurality of data streams includes a first data stream and a second data stream, and the plurality of flags includes a first flag associated with the first data stream and a second flag associated with the second data stream.

9. The non-transitory computer-accessible storage medium of claim 7, wherein a first hardware instruction of the plurality of chained hardware instructions includes performing a first operation on a first data stream to generate and store first intermediate data, wherein the first operation is based on at least a first flag of the plurality of flags.

10. The non-transitory computer-accessible storage medium of claim 9, wherein the operations further include:
performing, by the hardware acceleration circuit, a second operation on a second data stream of the plurality of data streams to generate and store second intermediate data, in response to executing a second hardware instruction of the plurality of chained hardware instructions; and
performing, by the hardware acceleration circuit, a third operation using the first intermediate data and the second intermediate data, in response to executing a third hardware instruction of the plurality of chained hardware instructions.

11. The non-transitory computer-accessible storage medium of claim 9, wherein a second hardware instruction includes performing a second operation on a second data stream of the plurality of data streams and the first intermediate data, in response to executing a second hardware instruction of the plurality of chained hardware instructions.

12. The non-transitory computer-accessible storage medium of claim 9, wherein the first operation includes gathering the first data stream based on metadata associated with the plurality of flags, wherein the metadata includes a list of offsets and lengths.

13. The non-transitory computer-accessible storage medium of claim 9, wherein the first operation includes indexing the first data stream based on metadata associated with the plurality of flags, wherein the metadata includes a vector of indices, and wherein performing a first operation includes accessing an array using at least one index included in the vector of indices.

14. A system, comprising:
a hardware acceleration circuit;
a memory configured to store a plurality of software instructions, and a library that includes a plurality of library functions, wherein a particular library function of the plurality of library functions is implemented by the hardware acceleration circuit; and
a processor configured to:
in response to executing a given software instruction of the plurality of software instructions, perform a single call to a particular library function of the plurality of library functions, wherein the single call specifies a plurality of flags and specifies operations on a plurality of data streams; and
generate a plurality of chained hardware instructions in response to the single call, wherein the plurality of chained hardware instructions is based on different ones of the plurality of flags and that operate on different ones of the plurality of data streams; and
send the plurality of chained hardware instructions to the hardware acceleration circuit for execution to implement the particular library function.

15. The system of claim 14, wherein to generate the plurality of chained hardware instructions, the processor is further configured to translate the particular library function into the plurality of chained hardware instructions.

16. The system of claim 14, wherein the hardware acceleration circuit is configured to execute a first hardware instruction of the plurality of chained hardware instructions using a first data stream of the plurality of data streams to generate first intermediate data.

17. The system of claim 16, wherein the hardware acceleration circuit is further configured to:
execute a second hardware instruction of the plurality of chained hardware instructions to generate and store second intermediate data; and
execute a third hardware instruction of the plurality of chained hardware instructions using the first intermediate data and the second intermediate data.

18. The system of claim 16, wherein the hardware acceleration circuit is further configured to execute a second hardware instruction of the plurality of chained hardware instructions using a second data stream of the plurality of data streams and the first intermediate data.

19. The system of claim 16, wherein to execute the first hardware instruction, the hardware acceleration circuit is further configured to gather first data based upon metadata associated with a first flag of the plurality of flags, and wherein the metadata includes a list of offsets and lengths.

20. The system of claim 16, wherein to execute the first hardware instruction, the hardware acceleration circuit is further configured to index first data based upon metadata associated with a first flag of the plurality of flags, and wherein the metadata includes a vector of indices.

* * * * *

UNITED STATES PATENT AND TRADEMARK OFFICE
CERTIFICATE OF CORRECTION

PATENT NO. : 10,387,163 B2
APPLICATION NO. : 15/841375
DATED : August 20, 2019
INVENTOR(S) : Helman Page 1 of 1

It is certified that error appears in the above-identified patent and that said Letters Patent is hereby corrected as shown below:

In the Specification

In Column 6, Line 8, delete "INDEXED" and insert -- INDEXED. --, therefor.

In Column 8, Line 55, delete "INDEXED" and insert -- INDEXED. --, therefor.

Signed and Sealed this
Twenty-fifth Day of August, 2020

Andrei Iancu
*Director of the United States Patent and Trademark Office*